United States Patent
Liu et al.

(10) Patent No.: US 9,094,852 B2
(45) Date of Patent: Jul. 28, 2015

(54) IMPLEMENTATION OF PACKET DATA SERVICE IN A MOBILE COMMUNICATION NETWORK

(75) Inventors: Di Liu, Shanghai (CN); Xiao Li, Shanghai (CN); Feng Lu, Shanghai (CN); Hongtao Zhu, Shanghai (CN)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 0 days.

(21) Appl. No.: 14/236,607

(22) PCT Filed: Aug. 2, 2011

(86) PCT No.: PCT/CN2011/001267
§ 371 (c)(1),
(2), (4) Date: Jan. 31, 2014

(87) PCT Pub. No.: WO2013/016843
PCT Pub. Date: Feb. 7, 2013

(65) Prior Publication Data
US 2014/0160936 A1 Jun. 12, 2014

(51) Int. Cl.
*H04L 12/851* (2013.01)
*H04W 24/02* (2009.01)
(Continued)

(52) U.S. Cl.
CPC .......... *H04W 24/02* (2013.01); *H04L 47/2408* (2013.01); *H04L 47/2441* (2013.01);
(Continued)

(58) Field of Classification Search
CPC ....... H04W 4/24; H04W 68/00; H04W 28/20; H04W 28/06; H04W 72/005; H04W 4/06; H04W 4/00; H04W 80/04; H04W 80/02; H04L 47/2441; H04L 12/189; H04L 69/22; H04L 45/00; H04L 67/327; H04L 12/16; H04L 12/4641; H04L 2012/5638–2012/5651; H04L 12/1407; H04L 12/1403; H04L 12/14; H04L 65/1016; H04L 63/0272; H04L 67/146; H04L 12/1485; H04L 45/745; H04L 47/2425; H04L 47/2408; H04L 69/161; H04M 15/66; H04M 15/8016
USPC ......... 370/230, 235, 360, 252, 392, 338, 310, 370/254, 474, 395.3, 395.21; 455/408, 454, 455/466, 450, 452.2; 713/161; 379/93.01; 709/230, 232, 231
See application file for complete search history.

(56) References Cited

U.S. PATENT DOCUMENTS 7,151,776 B1 * 12/2006 Iyer et al. ................. 370/401
7,742,406 B1 * 6/2010 Muppala ................... 370/230
(Continued)

FOREIGN PATENT DOCUMENTS

| CN | 101340355 A | 1/2009 |
| CN | 101415013 A | 4/2009 |
| WO | WO 2010/112077 | * 10/2010 .............. H04L 12/56 |

OTHER PUBLICATIONS

3GPP TS 23.203 V11.2.0 (Technical Specification), 3rd Generation Partnership Project; Technical Specification Group Services and System Aspects;Policy and charging control architecture (Release 11), (Jun. 2011), 142 Pages.*
(Continued)

*Primary Examiner* — Edan Orgad
*Assistant Examiner* — Ivan O Latorre
(74) *Attorney, Agent, or Firm* — Rothwell, Figg, Ernst & Manbeck, P.C.

(57) ABSTRACT

A method for transferring a data packet associated with a service from a packet data network to a mobile communication network, be characterized by comprising steps of: forming a message by adding either a service identifier (SI) for identifying the service or an indicator for indicating that the data packet is associated with the SI to the data packet, the SI corresponding to a session identifier for the data packet; and sending the message from the packet data network to the mobile communication network.

16 Claims, 6 Drawing Sheets

(51) Int. Cl.
 H04L 29/06 (2006.01)
 H04L 29/08 (2006.01)
 H04W 76/02 (2009.01)
 H04W 28/02 (2009.01)
(52) U.S. Cl.
 CPC ............ *H04L 67/327* (2013.01); *H04L 69/161* (2013.01); *H04W 28/0231* (2013.01); *H04W 76/022* (2013.01)

(56) References Cited

U.S. PATENT DOCUMENTS

| | | | |
|---|---|---|---|
| 7,864,764 B1* | 1/2011 | Ma et al. | 370/389 |
| 2004/0266394 A1* | 12/2004 | Mizell et al. | 455/408 |
| 2005/0043035 A1* | 2/2005 | Diesen et al. | 455/454 |
| 2006/0185002 A1* | 8/2006 | Bachmutsky et al. | 726/4 |
| 2007/0121615 A1* | 5/2007 | Weill et al. | 370/389 |
| 2008/0276085 A1* | 11/2008 | Davidson et al. | 713/161 |
| 2009/0080387 A1* | 3/2009 | Dell'Uomo et al. | 370/338 |
| 2009/0238192 A1* | 9/2009 | Dolganow et al. | 370/400 |
| 2010/0046418 A1* | 2/2010 | Horn et al. | 370/315 |
| 2010/0074110 A1* | 3/2010 | Huang et al. | 370/230 |
| 2012/0092992 A1* | 4/2012 | Pappas et al. | 370/235 |
| 2012/0208502 A1* | 8/2012 | Perras | 455/411 |
| 2012/0320751 A1* | 12/2012 | Zhu | 370/236 |

OTHER PUBLICATIONS

3GPP TS 23.060 V10.4.0 3rd Generation Partnership Project; Technical Specification Group Services and System Aspects; General Packet Radio Service (GPRS); Service description; Stage 2 (Release 10), Jun. 2011, 321 Pages.*

* cited by examiner

IMPLEMENTATION OF PACKET DATA SERVICE IN A MOBILE COMMUNICATION NETWORK

CROSS REFERENCE TO RELATED APPLICATION(S)

This application is a 35 U.S.C. §371 National Phase Entry Application from PCT/CN2011/001267, filed Aug. 2, 2011, designating the United States, the disclosure of which is incorporated herein in its entirety by reference.

TECHNICAL FIELD

The present invention generally relates to implementation of packet data service in a mobile communication network. More particularly, the present invention relates to a method for transferring data from a packet data network to a mobile communication network and a method for radio resources management on a service-basis in a mobile communication network. The present invention also relates to apparatus adapted for the same purpose.

BACKGROUND

The mobile Internet has changed the way people communicate, stay informed, and are entertained. This requires operators to deploy a core network that combines performance with intelligence. In order to interwork with IP-based network, the General Packet Radio Service (GPRS) core network is provided for IP packet services in GSM and WCDMA networks. For the next generation mobile wireless technology, an all-IP core network, called the Evolved Packet System (EPS), is proposed for supporting both 3GPP and non-3GPP networks.

With more compelling services and multimedia mobile computing devices, users are increasingly entering the network and consuming significant bandwidth. However, there is a challenge for ensuring efficient resources utilization in 3GPP and non-3GPP networks while providing a diversity of services. Moreover, this issue becomes more complicated due to the introduction of Machine Type of Communication (MTC) devices.

Quality of service (QoS) is the ability to provide different priority to different applications, users, or data flows, or to guarantee a certain level of performance to a data flow. A network or protocol that supports QoS may agree on a traffic contract with the application software and reserve capacity in the network nodes, for example during a session establishment phase. During the session it may monitor the achieved level of performance, for example the data rate and delay, and dynamically control scheduling priorities in the network nodes. It may release the reserved capacity during a tear down phase. Typically, QoS is defined as a group of quality requirements on the collective behavior of one or more objects and comprises attributes on all the aspects of a connection, such as service response time, loss, signal-to-noise ratio, cross-talk, echo, interrupts, frequency response, loudness levels, and the like.

In some cases, however, QoS is insufficient to reflect characteristics on services. For example, some services, such as instant message (IM), consume enormous amount of resources, and thus data flows associated with them shall be monitored and controlled so as to achieve an efficient and quick radio resources management in mobile communication networks. Unfortunately, QoS is inadequate for identifying such data flows and until now, no solution is available for dealing with this issue.

SUMMARY OF THE INVENTION

In light of the above, one of the objects of the present invention is to provide an improved solution for transferring data from a packet data network to a mobile communication network which can conveniently and quickly identify a service pattern.

According to one aspect of the invention, a method for transferring a data packet associated with a service from a packet data network to a mobile communication network, be characterized by comprising steps of:
   forming a message by adding either a service identifier (SI) for identifying the service or an indicator for indicating that the data packet is associated with the SI to the data packet, the SI corresponding to a session identifier for the data packet; and
   sending the message from the packet data network to the mobile communication network.

In a preferred embodiment according to the present invention, wherein the step of forming the message is performed by encapsulating the data packet in a GTP-U message with a GTP-U extension header including the SI or by encapsulating the data packet in a GTP-U message with a GTP-U header including the indicator.

In another preferred embodiment according to the present invention, wherein the session identifier is represented as a IP 5-tuple including an IP address and a port number of a sender, an IP address and a port number of a receiver, and a protocol number.

According to another aspect of the invention, an apparatus for transferring a data packet related to a service from a packet data network to a mobile communication network, be characterized by comprising:
   means for forming a message by adding either a service identifier (SI) for identifying the service or an indicator for indicating that the data packet is associated with the SI to the data packet, the SI corresponding to a session identifier for the data packet; and
   means for sending the message from the packet data network to the wireless communication network.

In a preferred embodiment according to the present invention, wherein the apparatus is implemented as a Packet Data Network Gateway or a Gateway GPRS Support Node.

Moreover, another one of the objects of the present invention is to provide an improved solution for radio resources management which can achieve efficient resources utilization.

According to still another aspect of the invention, a method for radio resources management on a service-basis in a mobile communication network, be characterized by comprising steps of:
   receiving a message including a data packet associated with a service together with a service identifier (SI) for identifying the service or an indicator for indicating that the data packet is associated with the SI, the SI corresponding to a session identifier for the data packet;
   extracting the SI from the message or obtaining the SI based on the session identifier; and
   allocating radio resources for the data packet based on a policy corresponding to the SI.

In a preferred embodiment according to the present invention, wherein the step of obtaining the SI comprising:

if the message includes the indicator, extracting the session identifier from the data packet; and retrieving the SI corresponding to the extracted session identifier in a database, where an association between the SI and the extracted session identifier is stored.

In a preferred embodiment according to the present invention, wherein the database is created by upon receiving a message including a SI, associating the SI included therein with a session identifier included in a data packet of the received message.

According to still another aspect of the invention, an apparatus for radio resources management on a service-basis in a mobile communication network, be characterized by comprising:

means for receiving a message including a data packet associated with a service together with a service identifier (SI) for identifying the service or an indicator for indicating that the data packet is associated with the SI, the SI corresponding to a session identifier for the data packet;

means for extracting the SI from the message or obtaining the SI based on the session identifier; and means for allocating radio resources for the data packet based on a policy corresponding to the SI.

In a preferred embodiment according to the present invention, wherein the apparatus is implemented as an eNodeB, a RNS, or a Base Station Sub-system.

BRIEF DESCRIPTION OF THE DRAWINGS

The foregoing and other objects, features, and advantages of the invention will be apparent from the following more particular description of preferred embodiments as illustrated in the accompanying drawings in which.

DETAILED DESCRIPTION

While the invention covers various modifications and alternative constructions, embodiments of the invention are shown in the drawings and will hereinafter be described in detail. However, it should be understood that the specific description and drawings are not intended to limit the invention to the specific forms disclosed. On the contrary, it is intended that the scope of the claimed invention includes all modifications and alternative constructions thereof falling within the scope of the invention as expressed in the appended claims.

Unless defined in the context of the present description, otherwise, all technical and scientific terms used herein have the same meaning as commonly understood by one of ordinary skill in the art to which this invention belongs.

Moreover, it should be understood that the present invention is applicable to any mobile communication systems, such as GSM system, WCDMA system, CDMA2000 system and TD-CDMA system.

Figure 1:
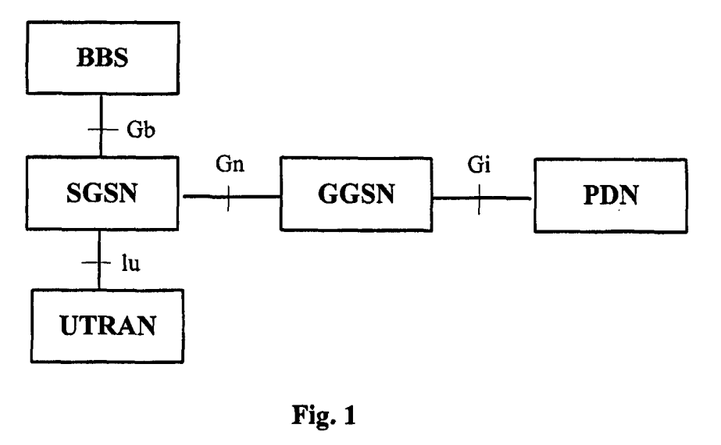
FIG. 1 shows a schematic GPRS core network architecture.

FIG. 1 shows a schematic GPRS core network architecture. The GPRS core network provides mobility management, session management and transport for Internet Protocol packet services in GSM and WCDMA networks. For illustrative purpose, the GPRS Core Network functionality is logically implemented on two network nodes, i.e., the Serving GPRS Support Node (SGSN) and the Gateway GPRS Support Node (GGSN).

The GGSN is responsible for the interworking between the GPRS network and external packet data networks, like the Internet and X.25 networks. From an external network's point of view, the GGSN is a router to a sub-network, because the GGSN 'hides' the GPRS infrastructure from the external network. When the GGSN receives data addressed to a specific user, it checks if the user is active. If it is, the GGSN forwards the data to the SGSN serving the mobile user, but if the mobile user is inactive, the data is discarded. On the other hand, mobile-originated packets are routed to the right network by the GGSN.

A SGSN is responsible for the delivery of data packets from and to the UTRAN or BSS. Its tasks include packet routing and transfer, mobility management (attach/detach and location management), logical link management, and authentication and charging functions.

The details on GPRS core network architecture are described in 3GPP TS 23.060, which is incorporated by reference in its entirety.

Figure 2:
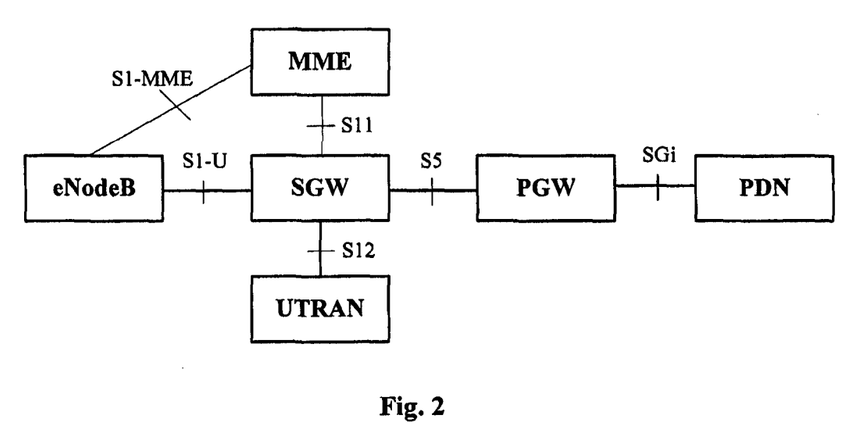
FIG. 2 shows a schematic Evolved Packet System (EPS) network architecture with 3GPP access.

FIG. 2 shows a schematic Evolved Packet System (EPS) network architecture with 3GPP access. The main component of the architecture is the Evolved Packet Core (EPC), also known as System Architecture Evolution (SAE) Core. The EPC serves as equivalent of GPRS networks and comprises Mobility Management Entity (MME), Serving Gateway (SGW) and PDN Gateway (PGW).

The SGW routes and forwards user data packets, while also acting as the mobility anchor for the user plane during inter-eNodeB handovers and as the anchor for mobility between LTE and other 3GPP technologies (terminating S4 interface and relaying the traffic between 2G/3G systems and PGW). It manages and stores UE contexts, e.g. parameters of the IP bearer service, network internal routing information.

The PGW provides connectivity from the UE to external packet data networks by being the point of exit and entry of traffic for the UE. A UE may have simultaneous connectivity with more than one PGW for accessing multiple PDNs. The PGW performs policy enforcement, packet filtering for each user, charging support, lawful interception and packet screening.

The following embodiments are described in the context of the above architectures. However, one skilled artisan in the art would recognize that the present invention are applicable to any other architecture where packet domain and mobile network domain are interworked.

GPRS tunneling protocol (GTP) allows end users of a mobile communication system such as GSM, UMTS, TD-SCDMA or LTE network to move from place to place while continuing to connect to the Internet as if from one location at the GGSN or PGW. It does this by carrying the subscriber's data from the subscriber's current SGSN or SGW to the GGSN or PGW which is handling the subscriber's session. The details on GTP protocol are described in 3GPP TS 29.281, which is incorporated by reference in its entirety.

For illustrative purpose, it assumes herein that the embodiments as described below are used in the GPRS core network architecture as shown in FIG. 1 and the Evolved Packet System (EPS) network architecture as shown in FIG. 2. However, one skilled artisan in the art would appreciate that the present invention is applicable to any other protocols and mechanisms for carrying General Packet Radio Service (GPRS) within GSM, UMTS and LTE networks.

According to one embodiment of the present invention, a service with a group of features or attributes is identified by a Service Identifier (SI). The examples of the above-mentioned features and attributes may include but be not limited to service provider, data flow for e.g., video stream, voice message or text message, subscriber rating, charge mode, and the combinations thereof. In one embodiment according to the present invention, a SI may be assigned to a service provided by a service provider "A", which allows a VIP subscriber to download a video clip into his electronic device. As a result, a mobile communication network is able to recognize GTP messages corresponding to a specific service and perform a special handling in radio resources management. In a preferred embodiment, a data packet involved in such specific service is encapsulated with a SI so as to form a GTP message. Upon receiving the GTP message, those entities in a mobile communication network, such as eNodeB, UTRAN, or BSS, may identify the service and allocate radio resources according to a special policy.

In order to improve efficiency for transmission and processing, according to one embodiment of the present invention, the encapsulation with SIs into the message is performed only if the current data packet is the first one during a session. Alternatively, the SIs may be added into the message periodically. Afterwards, data packets involved in an identified service are encapsulated with an indicator informing that the SI for this service has been transmitted by means of the previous message(s). For a session, it can be identified by a unique identifier or a session identifier. As an example, a set of addresses called IP 5-tuple, including an IP address and a port number of a sender, an IP address and a port number of a receiver, and a protocol number, may be used as a session identifier. Note that a message or a data packet can be linked to a session, and therefore the service which the message is involved in can be identified if relationship between SIs and session identifiers is known. In one preferred embodiment, a database is created to store such relationship and the SI can be determined by retrieving the database based on the session identifier. For this end, when receiving a GTP message including a SI, the eNodeB, the UTRAN or the BSS will have the SI associated with the session which the GTP message is linked to. In other words, the eNodeB, the UTRAN or the BSS will register an identifier for the session as one corresponding to the SI in the database.

As an exemplary example, the relationship as described above may be recorded in the following form in the database.

TABLE 1

| IMSI (can be GUTI + TAI as well) | PDN connect Bear ID | IP 5-Tuple | SI |
|---|---|---|---|
| MS1 Bear1 | IMSI 1 | PDN Connext1, bear1 | IP 5-Tuple 1 | 0x01 |

TABLE 1-continued

| IMSI (can be GUTI + TAI as well) | PDN connect Bear ID | IP 5-Tuple | SI |
|---|---|---|---|
| MS1 Bear1 | IMSI 1 | PDN Connext1, bear1 | IP 5-Tuple 2 | 0x02 |
| MS1 Bear2 | IMSI 1 | PDN Connext2, bear1 | IP 5-Tuple 3 | 0x01 |
| MS2 Bear1 | IMSI 2 | PDN Connext2, bear1 | IP 5-Tuple 4 | Not initialized |
| ... | ... | ... | ... | ... |

As shown in Table 1, IP 5-Tuples 1 and 3 correspond to SI "0x01" and IP 5-Tuple 2 corresponds to SI "0x02".

Note that in the 3GPP context, the concept of "MS", i.e., mobile station, has its counterpart "UE".

Figure 3:
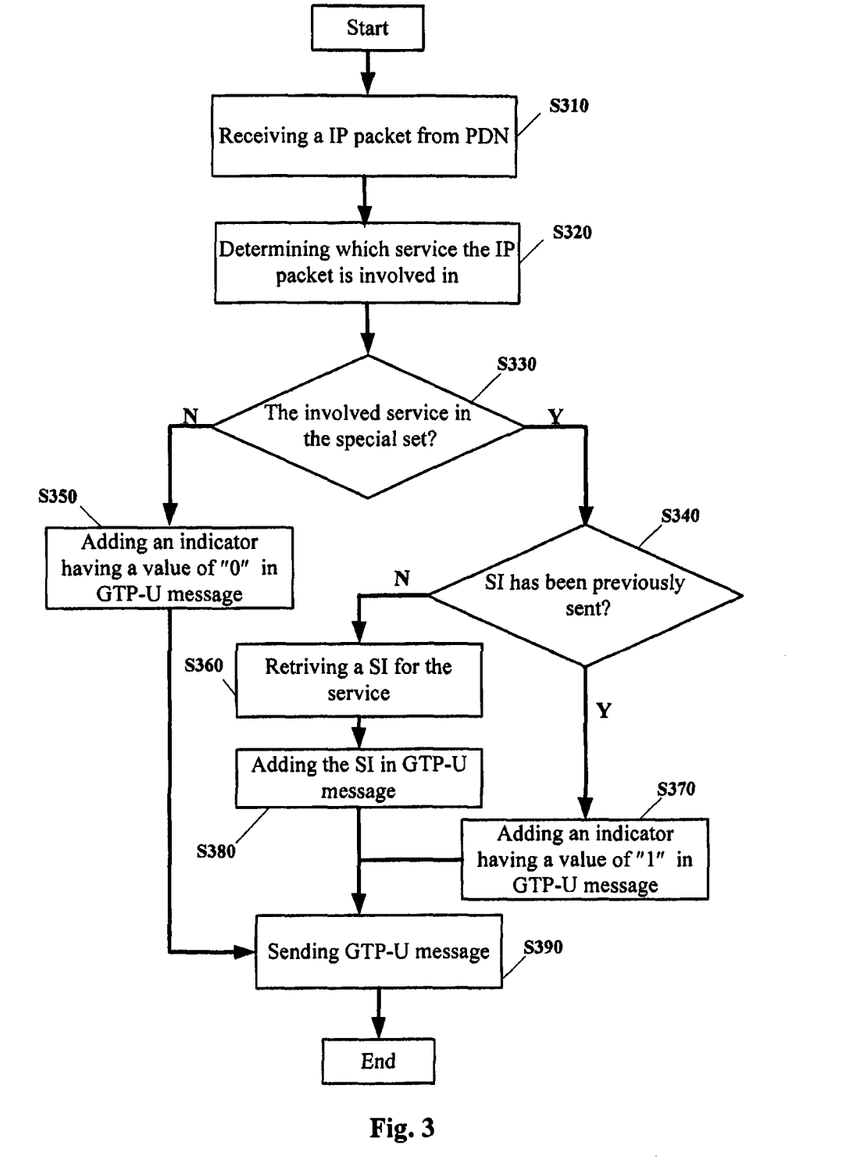
FIG. 3 is a flowchart illustrating method steps for transferring a data packet from a packet network to a mobile communication according to one exemplary embodiment of the present invention.

FIG. 3 is a flowchart illustrating method steps for transferring a data packet from a packet network to a mobile communication according to one exemplary embodiment of the present invention. In this embodiment, it defines a set of services, which shall be handled according to special policies when performing radio resources management at a mobile communication network (also referred to as a specific set hereinafter). Accordingly, the services in the special set are assigned to the respective SIs. In one non-limited example, a video service for allowing an unlimited download and provide by the service provider "A" is listed in the special set and it may prescribes that the resources-usage of this service is restricted or has the lowest priority. In one embodiment of the present invention, the services in the above special set and their SIs are stored in a look-up table for retrieving.

With reference to FIG. 3, at step S310, the GGSN as shown in FIG. 1 receives an IP packet from PDN via Gi interface. For the architecture as shown in FIG. 2, the IP packet is sent from PDN to the PGW via SGi interface. Note that the packet received at the GGSN or the PGW may be in any formats, e.g., including but not limited to IPv4, IPv6, or PPP format.

Then, at step 320, the GGSN or the PGW determines which service the received IP packet is involved in. Some approaches are available for such determination. For example, if a service has a fixed destination IP address and a fixed port number, the combinations thereof can be utilized to determine the type of service. To this end, the GGSN or the PGW may extract the IP address and the port number of a sender from IP/TCP header of the received IP packet. In another example, if the service depends on a protocol at a higher layer, e.g., Application Layer, the GGSN or the PGW may perform a DPI (Deep Packet Inspection) on the data field of the IP packet to determine the type of the service.

Next, at step S330, the GGSN or the PGW determines whether the IP packet is involved in a service as listed in the above special set. If it is the case, the process proceeds to step S340; otherwise, the process proceeds to step S350.

At step S340, the GGSN or the PGW further determines whether the SI for the service has been reported to the mobile communication network previously. If it is the case, the process proceeds to step S360; otherwise, the process proceeds to step S370.

Alternatively, the GGSN or the PGW may periodically report the SI to the mobile communication network. For this end, at step 340, the GGSN or the PGW will determine whether a predetermined time interval lapses away since the latest reporting of the SI, or whether a predetermined number of the IP packets involved in the service have been received since the latest reporting of the SI. If it is the case, the process proceeds to step S360; otherwise, the process proceeds to step S370.

At step S360, the GGSN or the PGW retrieves the SI in the look-up table as described above, and then at step S380, the GGSN or the PGW encapsulates the IP packet and the retrieved SI into a GTP-U message with an extension header. In one embodiment of the present invention, the SI is filled in the extension header. Then, the process proceeds to step S390.

At step S370, the GGSN or the PGW encapsulates the IP packet and an indicator into a GTP-U message with a header. The following Table 2 shows a header as defined in 3GPP TS 29.281. According to one embodiment of the present invention, the reserved bit, i.e., the $4^{th}$ bit of the header as shown in Table 2, is used for the indicator "SI Check" and its value is set as, e.g., "1" for indicating that the GTP-U message is involved in a service as defined in the above set. Then, the process proceeds to step S390.

TABLE 2

| Octets | Bits | | | | | | | |
|---|---|---|---|---|---|---|---|---|
| | 8 | 7 | 6 | 5 | 4 | 3 | 2 | 1 |
| 1 | Version | | PT | (*)Indicator | | E | S | PN |
| 2 | Message Type | | | | | | | |
| 3 | Length ($1^{st}$ Octet) | | | | | | | |
| 4 | Length ($2^{nd}$ Octet) | | | | | | | |
| 5 | Tunnel Endpoint Identifier ($1^{st}$ Octet) | | | | | | | |
| 6 | Tunnel Endpoint Identifier ($2^{nd}$ Octet) | | | | | | | |
| 7 | Tunnel Endpoint Identifier ($3^{rd}$ Octet) | | | | | | | |
| 8 | Tunnel Endpoint Identifier ($4^{th}$ Octet) | | | | | | | |
| 9 | Sequence Number ($1^{st}$ Octet) | | | | | | | |
| 10 | Sequence Number ($2^{nd}$ Octet) | | | | | | | |
| 11 | N-PDU Number | | | | | | | |
| 12 | Next Extension Header Type | | | | | | | |

For another branch, i.e., at step S350, the GGSN or the PGW encapsulates the IP packet and an indicator into a GTP-U message with a header. The $4^{th}$ bit of the header is also used for the indicator but the value is set as, e.g., "0" for indicating that the involved service is not listed in the above set. Then, the process proceeds to step S390.

At step S390, the GGSN sends the GTP-U message to the SGSN via Gn interface. For the architecture as shown in FIG. 2, the PGW sends the GTP-U message to the SGW via S5 interface.

Figure 4:
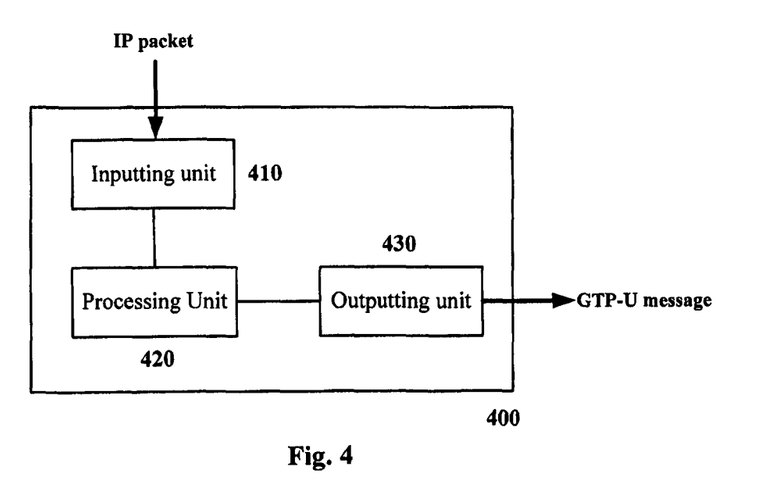
FIG. 4 is a block diagram illustrating one embodiment of an apparatus for transferring a data packet from a packet network to a mobile communication according to the present invention.

FIG. 4 is a block diagram illustrating one embodiment of an apparatus for transferring a data packet from a packet network to a mobile communication according to the present invention. The illustrative apparatus as shown herein may be implemented as the GGSN as shown in FIG. 1 or the PGW as shown in FIG. 2.

With reference to FIG. 4, the apparatus 400 comprises an inputting unit 410, an outputting unit 420, and a processing unit 430, which is coupled to the inputting unit 410 and the outputting unit 420.

The inputting unit 410 receives a data flow consisting of data packets from PDN, e.g., the Internet and X.25 networks. In one embodiment of the present invention, the data packets are in IP format.

The received data flow is sent to the processing unit 430, where each data packet is encapsulated so as to generate a GTP-U message. In one embodiment of the present invention, the processing unit 430 generates the GTP-U message in such a manner as that described in the embodiments with reference to FIG. 3. In particular, for each data packet, the processing unit 430 will determine whether it is involved in one of the services as defined in the set and if it is the case, the processing unit 430 will encapsulate the data packet together with its SI in a GTP-U message with an extension header or will encapsulate the data packet together with an indicator being set as a value, e.g., "1", in a GTP-U message with a header. As for those not involved in the defined services, they are encapsulated with an indicator being set as a value, e.g., "0", in a GTP-U message with a header.

The processing unit 430 further transfers the GTP-U message to the outputting unit 420, which in turn sends the GTP-U message to the entities in the mobile communication network, e.g., SGSN and SGW.

Figure 5:
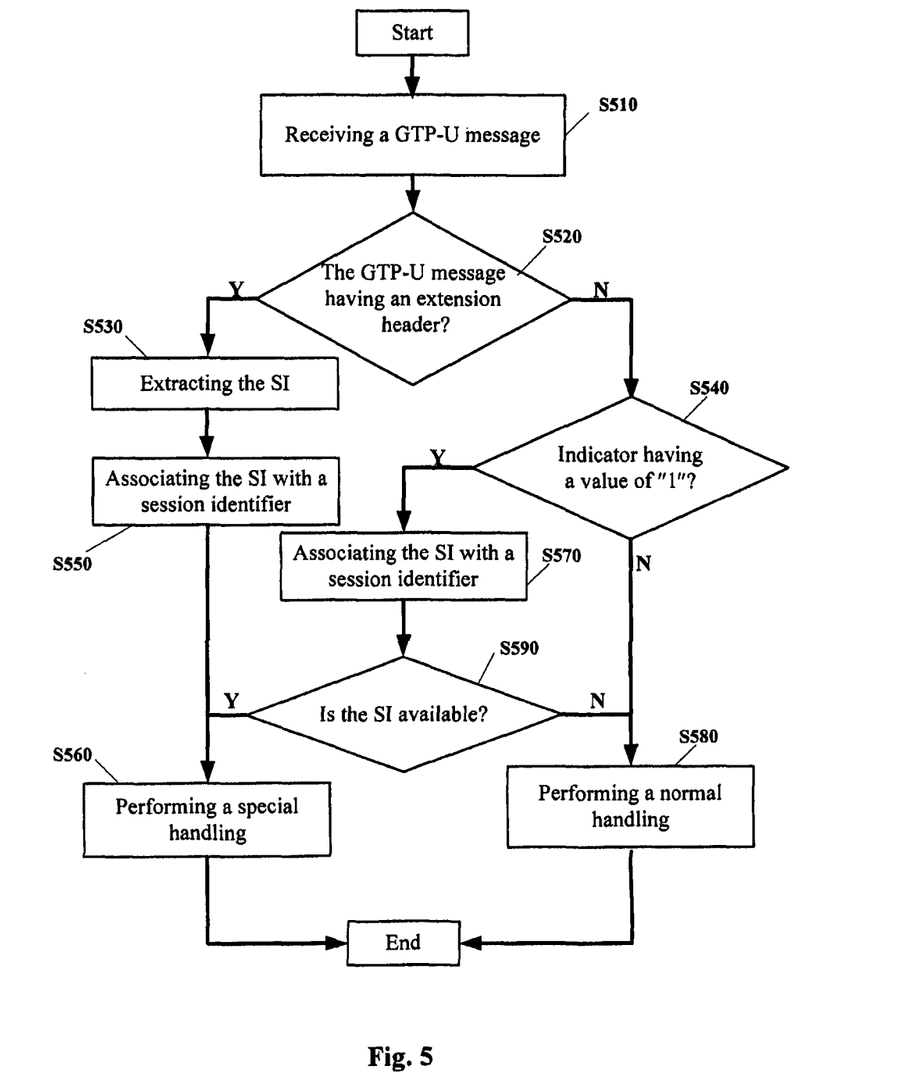
FIG. 5 is a flowchart illustrating method steps for radio resources management according to one exemplary embodiment of the present invention.

FIG. 5 is a flowchart illustrating method steps for radio resources management according to one exemplary embodiment of the present invention. Again, in this embodiment, it assumes that a set of services needs to have special handling in radio resources management and the services in the set and their SIs are stored in a look-up table for retrieving.

With reference to FIG. 5, at step S510, the BSS or the UTRAN as shown in FIG. 1 receives a GTP-U message from the SGSN via Gb or Iu interface. For the architecture as shown in FIG. 2, the eNodeB or the UTRAN receives a GTP-U message from SGW via S1-U or S12 interface.

As described above, the received GTP-U message may comprise a header or an extension header. Therefore, at step S520, the BSS, the eNodeB or the UTRAN determines whether the GTP-U message comprises an extension header and if it is the case, the process proceeds to step S530; otherwise, the process proceeds to step S540.

At step S530, the BSS, the eNodeB or the UTRAN extracts the SI from the extension header of the received GTP-U message, and then at step S550, the BSS, the eNodeB or the UTRAN establishes an association of the extracted SI with the session which the GTP message is linked to or the session identifier for the session in a database. According to one embodiment of the present invention, the session identifier may be in form of a set of addresses called IP 5-tuple and relationship between the SIs and the session identifiers may be recorded in form of table 1.

Next, at step S560, the eNodeB, the UTRAN or the BSS handles the received GTP-U message based on a special policy.

For another branch, i.e., at step S540, the BSS, the eNodeB or the UTRAN extracts the indicator from the header of the received GTP-U message. If the indicator has a value of "1", the process proceeds to step S570; otherwise, the process proceeds to step S580 where the eNodeB, the UTRAN or the BSS handles the received GTP-U message in a normal mode.

Then, at step S570, the BSS, the eNodeB or the UTRAN retrieves the respective SI based on the session identifier in the database, and at step S590, the BSS, the eNodeB or the UTRAN determines whether the SI is available. If the SI is available, the process proceeds to step S560; otherwise, the process proceeds to step S580.

Figure 6:
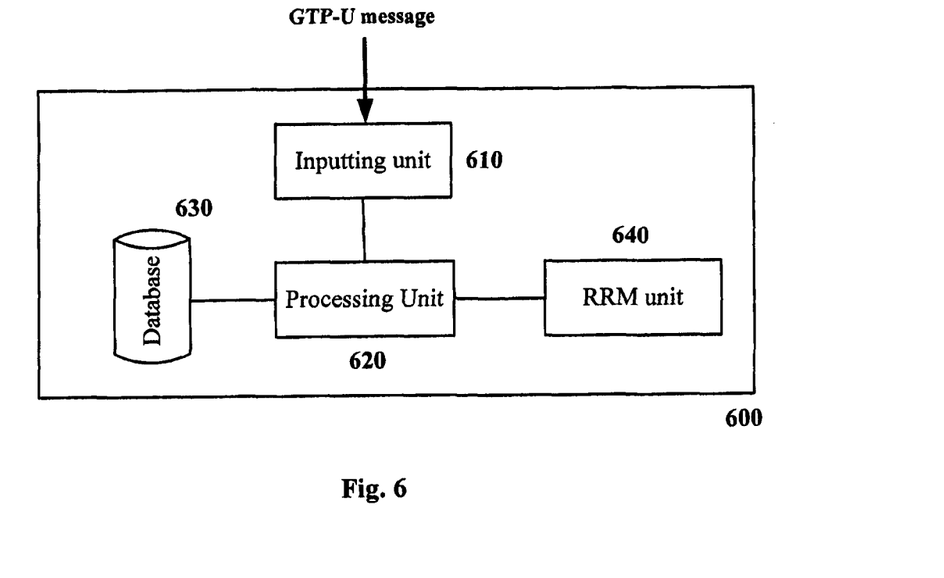
FIG. 6 is a block diagram illustrating another embodiment of an apparatus for radio resources management according to the present invention.

FIG. 6 is a block diagram illustrating another embodiment of an apparatus for radio resources management according to the present invention. The illustrative apparatus as shown herein may be implemented as the BSS or the UTRAN as shown in FIG. 1 or the eNodeB or the UTRAN as shown in FIG. 2.

With reference to FIG. 6, the apparatus 600 comprises an inputting unit 610, a processing unit 620, a database 630, and a radio resources management (RRM) unit 640, wherein the processing unit is coupled to the inputting unit 610, the database 630 and the radio resources management (RRM) unit 640, and the database 630 stores relationship between SIs and session identifiers.

The inputting unit 610 receives GTP-U messages from the SGSN or the SGW. The received GTP-U message is then sent to the processing unit 620, which in turn determines whether the service that the GTP-U message is involved in is listed in the special set. In one embodiment of the present invention, the processing unit 620 performs the determination in such a manner as that described in the embodiments with reference to FIG. 5.

In particular, the processing unit 620 extracts the SI from the extension header of the GTP-U message, or extracts the indicator from the header of the GTP-U message. If the SI is available, the processing unit 620 reports the SI to the RRM unit 640. If the indicator is available and has a value of "1", the processing unit 620 obtains the respective SI by retrieving the database based on the session identifier and reports the result to the RRM unit 640. As a response, the RRM unit 640 handles the GTP-U message according to a special policy. When the indicator has a value of "0" or the retrieval fails, the processing unit 620 reports to the RRM unit 640 that the service, which the GTP-U message is involved in, is a normal one. As a response, the RRM unit 640 handles the GTP-U message in a normal mode.

Figure 7A:
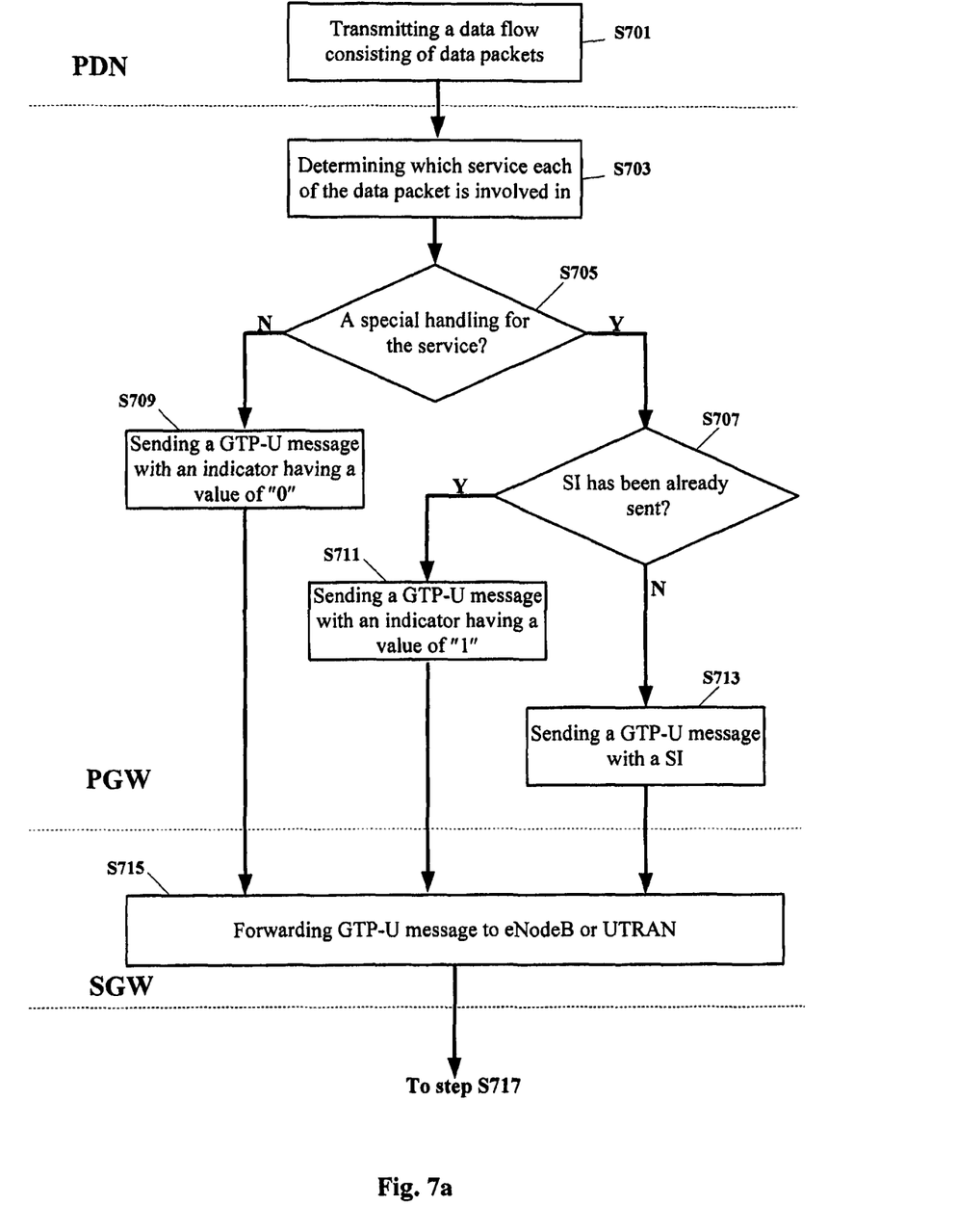
FIGS. 7a and 7b is a flowchart illustrating an exemplary process for radio resources management in EPS network architecture according to the present invention.
Figure 7B:
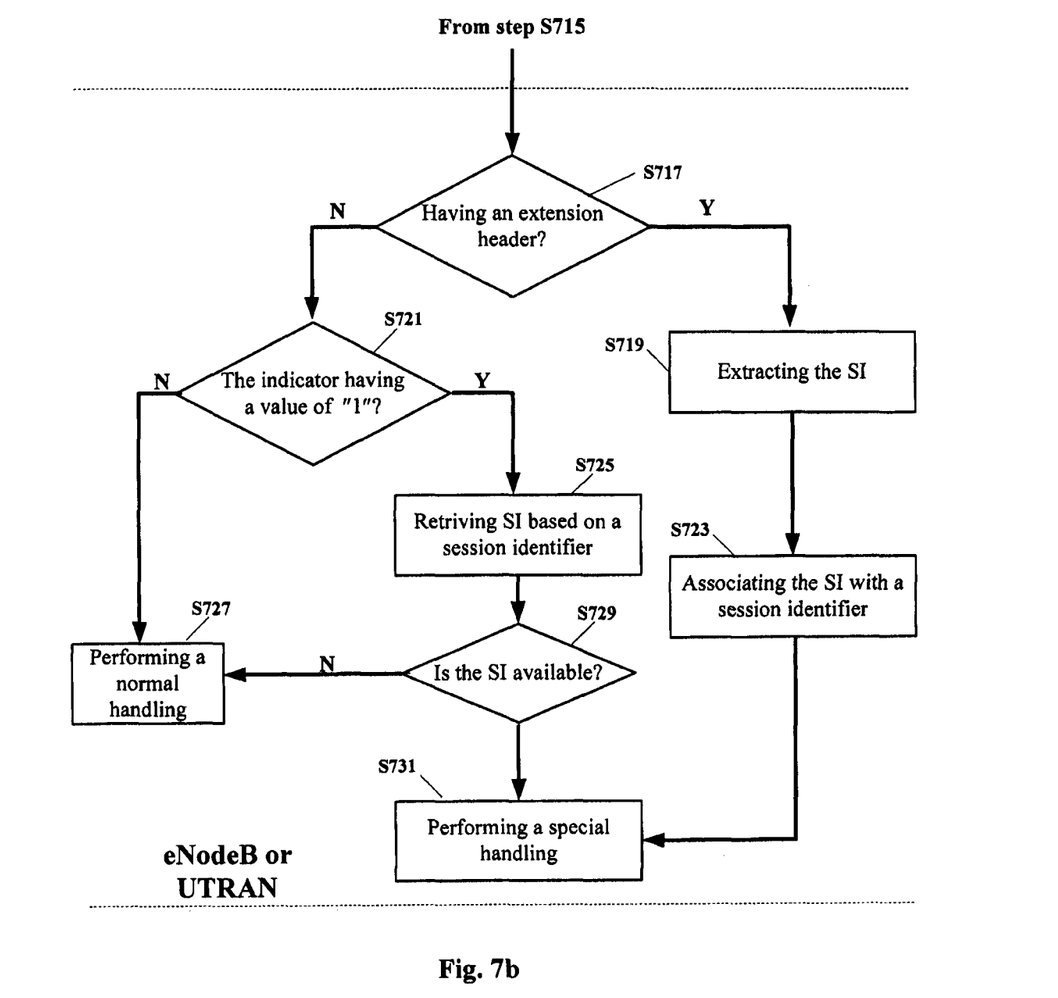

FIGS. 7a and 7b is a flowchart illustrating an exemplary process for radio resources management in EPS network architecture according to the present invention. For illustrative purpose, this embodiment is described in the scenario as shown in FIG. 2.

Referring to FIG. 7a, at step S701, the PDN transmits a data flow consisting of data packets to the PGW, which is responsible for encapsulating the data packets to generate GTP-U messages.

Steps S703-S713 are carried out at the PGW. At step S703, the PGW determines which service each of the data packets is involved in. As described above, the determination can be carried out by a number of approaches.

Then, at step 705, the PGW determines whether each of the data packets received from the PDN is involved in a service to be handled according to a special policy. According to one embodiment of the present invention, those services that need a special handling are recorded in a check list. If the involved service is within the check list, the process proceeds to step S707; otherwise, the process proceeds to step S709.

At step S707, the PGW further determines whether the SI corresponding to the involved service has been already reported to the eNodeB or the UTRAN. If it is the case, the process proceeds to step S711, where the PGW encapsulates the data packet into a GTP-U message with a header including an indicator having a value of e.g., "1" and sends the message to the SGW; otherwise, the process proceeds to step S713, where the PGW encapsulates the data packet into a GTP-U message with an extension header including the SI and sends the message to the SGW.

For another branch, i.e., at step S709, the PGW encapsulates the received data packet into a GTP-U message with a header including an indicator having a value of e.g., "0" and sends the message to the SGW.

At step S715, the SGW forwards the received GTP-U message with either a header or an extension header to the eNodeB or the UTRAN.

Continuing with FIG. 7b, at step S717, the eNodeB or the UTRAN determines whether the GTP-U message has an extension header. If it is the case, the process proceeds to step S719; otherwise, the process proceeds to step S721.

At step S719, the eNodeB or the UTRAN extracts the SI from the message, and then at step S723, establishes an association of the SI with the session which the GTP message is linked to by registering the session identifier for the session as one corresponding to the SI in a database.

Next, the process proceeds to step S731 where the eNodeB or the UTRAN handles the data packet according to a special policy.

As for a GTP-U message with a normal header, at step S721, the eNodeB or the UTRAN determines whether the involved service is within the check list based on the indicator extracted from the message. If the indicator has a value of "1", indicating the involved service needs a special handling, the process proceeds to step S725; otherwise, the process proceeds to step S727, where the eNodeB or the UTRAN handles the data packet in a normal mode.

At step S725, the eNodeB or the UTRAN determines the SI corresponding to the involved service by retrieving the database based on the session identifier.

Next, at step S729, the eNodeB or the UTRAN determines whether the SI is available or valid. If it is the case, the process proceeds to step S731; otherwise, the process proceeds to step S727.

It should be noted that the aforesaid embodiments are illustrative of this invention instead of restricting this invention, substitute embodiments may be designed by those skilled in the art without departing from the scope of the claims enclosed. The wordings such as "include", "including", "comprise" and "comprising" do not exclude elements or steps which are present but not listed in the description and the claims. It also shall be noted that as used herein and in the appended claims, the singular forms "a", "an", and "the" include plural referents unless the context clearly dictates otherwise. This invention can be achieved by means of hardware including several different elements or by means of a suitably programmed computer. In the unit claims that list several means, several ones among these means can be specifically embodied in the same hardware item. The use of such words as first, second, third does not represent any order, which can be simply explained as names.

What is claimed is:

1. A method for transferring a data packet associated with a service from a packet data network to a mobile communication network, comprising:
    forming a GPRS tunneling protocol-U (GTP-U) message by adding, to the data packet, a service identifier (SI) when the SI has not been previously sent or by adding an indicator for indicating that the data packet is associated with the SI when the SI has been previously sent, the SI corresponding to a session identifier for the data packet,
    wherein the message is formed by either encapsulating the SI or the indicator to the GTP-U message with a GTP-U header including the indicator; and
    sending the GTP-U message from the packet data network to the mobile communication network.

2. The method according to claim 1, wherein the service has one or more features selected from one or more of a service provider, a type of data flow, a subscriber rating, and a charge mode.

3. The method according to claim 1, wherein the session identifier is represented as a IP 5-tuple including an IP address and a port number of a sender, and IP address and a port number of a receiver, and a protocol number.

4. The method according to claim 1, wherein the SI corresponds to a Service Data Flow identifier or a set of Service Data Flow identifiers in 3GPP technical specification.

5. The method according to claim 1, wherein the mobile communication network is one selected from one of GSM, UMTS, TD-SCDMA and LTE networks.

6. The method of claim 1, wherein the SI is encapsulated into the GTP-U message only if the data packet is the first one during a session.

7. The method of claim 1, wherein the GTP-U message is linked to a session.

8. The method of claim 7, wherein the service, which the GTP-U message is involved in, can be identified by a relationship between the SI and the session identifier.

9. An apparatus for transferring a data packet related to a service from a packet data network to a mobile communication network, comprising:
   a memory;
   an inputting unit;
   an outputting unit; and
   a processor coupled to the memory, the inputting unit and the outputting unit, wherein said processor is configured to:
   form a GPRS tunneling protocol-U (GTP-U) message by adding, to the data packet, a service identifier (SI) for identifying the service when the SI has not been previously sent or by adding an indicator for indicating that the data packet is associated with the SI when the SI has been previously sent, the SI corresponding to a session identifier for the data packet,
   wherein the message is formed by encapsulating the SI or the indicator in a GTP-U message; and
   send the GTP-U message from the packet data network to the wireless communication network.

10. The apparatus according to claim 9, wherein the apparatus is implemented as a Packet Data Network Gateway or a Gateway GPRS Support Node.

11. A method for radio resources management on a service-basis in a mobile communication network, comprising:
   receiving a GPRS tunneling protocol-U (GTP-U) message including a data packet related to a service together with a service identifier (SI) for identifying the service when the GTP-U message has an extension header or an indicator for indicating that the data packet is associated with the SI when the GTP-U message does not have an extension header, the SI corresponding to a session identifier for the data packet;
   extracting the SI from the GTP-U message or obtaining the SI based on the session identifier; and
   allocating radio resources for the data packet based on a policy corresponding to the SI.

12. The method according to claim 11, wherein the step of obtaining the SI comprises:
   if the GTP-U message includes the indicator, extracting the session identifier from the data packet; and
   retrieving the SI corresponding to the extracted session identifier in a lookup table, where an association between the SI and the extracted session identifier is stored.

13. The method according to claim 12, wherein the lookup table is created by upon receiving a message including a SI, associating the SI included therein with a session identifier included in a data packet of the received message.

14. The method according to claim 11, wherein the service has one or more features selected from one or more of a service provider, a type of data flow, a subscriber rating, and a charge mode.

15. An apparatus for radio resources management on a service-basis in a mobile communication network, comprising:
   a Memory;
   an inputting unit;
   an outputting unit; and
   a processor coupled to the memory, the inputting unit and the outputting unit, wherein said processing unit is configured to:
   form a GPRS tunneling protocol-U (GTP-U) message including a data packet related to service together with a service identifier (SI) for identifying the service when the GTP-U message has an extension header or an indicator for indicating that the data packet is associated with the SI when the GTP-U message does not have an extension header, the SI corresponding to a session identifier for the data packet;
   extract the SI from the GTP-U message or obtain the SI based on the session identifier; and
   allocate radio resources for the data packet based on a policy corresponding to the SI.

16. The apparatus according to claim 15, wherein the apparatus is implemented as an eNodeB (eNB), radio network subsystem (RNS), or a Base Station Sub-system.

* * * * *